No. 698,713. Patented Apr. 29, 1902.
P. A. KLAWS.
APPLIANCE FOR ASSISTING THE HEARING.
(Application filed Oct. 2, 1901.)
(No Model.)
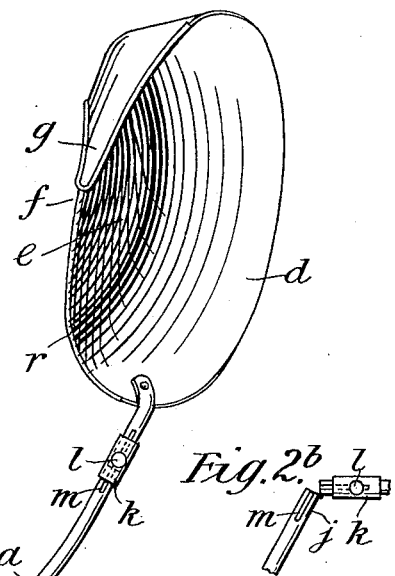
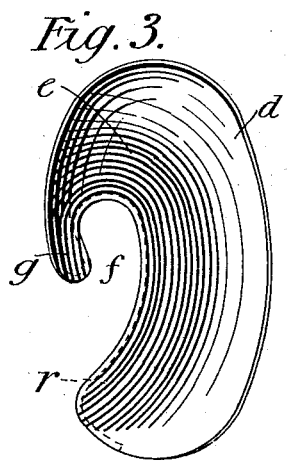
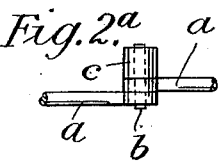
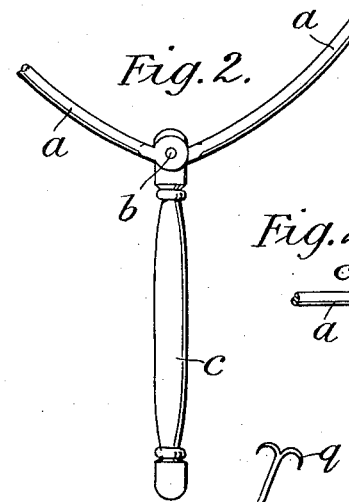
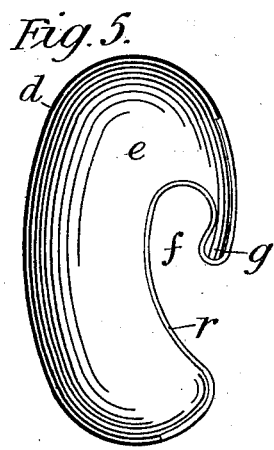
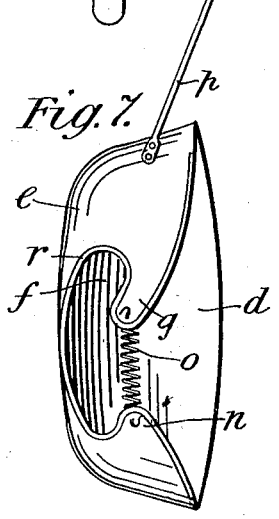
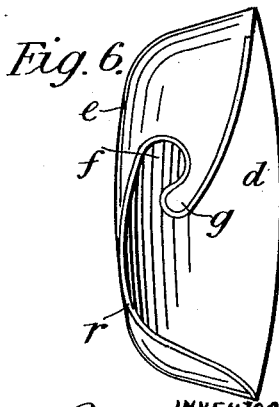
WITNESSES:
Isabella Waldron.
Adelaide Claire Gleason.
INVENTOR
Pauline Antonie Klaws.
BY Richards
ATTORNEYS

UNITED STATES PATENT OFFICE.

PAULINE ANTONIE KLAWS, OF MELBOURNE, VICTORIA, AUSTRALIA.

APPLIANCE FOR ASSISTING THE HEARING.

SPECIFICATION forming part of Letters Patent No. 698,713, dated April 29, 1902.

Application filed October 2, 1901. Serial No. 77,317. (No model.)

*To all whom it may concern:*

Be it known that I, PAULINE ANTONIE KLAWS, a subject of the King of Great Britain and Ireland, residing at No. 454 Collins street, Melbourne, in the State of Victoria, Australia, have invented a certain new and useful Appliance to Assist the Hearing, of which the following is a specification.

This invention provides an appliance the object of which is to assist the auditory powers of a wearer. It is designed to be worn at lectures, concerts, theaters, and meetings by persons having defective hearing and by the people generally who at such entertainments or meetings, particularly large meetings, are unable or have difficulty in hearing a speaker.

The appliance consists of a handle from which two arms branch, said arms terminating in shells or lobes that are suitably formed to be worn upon the ears.

The appliance is designed to fold up compactly and may be carried in a case provided for the purpose.

The shells or lobes of the appliance are constructed of aluminium, celluloid, or other suitable light material.

In order to make the invention clear, I will describe same with reference to the accompanying sheet of drawings, in which—

Figure 1 shows the appliance drawn to a small scale in position as worn. Fig. 2 shows front view in part of the appliance. Fig. $2^a$ is a section plan showing junction of handle with arms. Fig. $2^b$ shows joint on arm by which it is folded back. Fig. 3 shows inside of shell. Fig. 4 shows outside face of shell. Fig. 5 shows back of shell. Fig. 6 shows inside face of shell. Fig. 7 shows inside face view of a modified form of shell or lobe with spiral spring for better holding in position and with hook attachment.

$a$ $a$ represent rods or arms that are pivoted by pin $b$ to handle $c$. Each arm at its opposite end carries a shell or lobe. This shell or lobe is of the form of a basin, of which $d$ forms the rim and $e$ the base. A portion at $f$ is cut away, this portion being more or less of the form of the human ear. A projecting portion $g$ is left by this cut-away portion and will form a hold upon the ear, and the base of this cut-away portion gradually dies into the basin edge. The edge $r$ of the lobe which comes in contact with the ear is turned over in order to obviate the otherwise sharp edge and to make the appliance comfortable to the wearer. The arms $a$ $a$ are broken near the lobes, and the parts are connected by hinges $j$. Sleeves $k$ are provided to cover the joints, and screw-pins $l$ pass through the sleeves and are arranged to project into grooves $m$, formed on each portion of the arms. The rods may be made rigid by setting the sleeves over the joints, as when the appliance is in use, and when sleeves are removed from the joint, as shown on Fig. $2^b$, the rods will be free to turn on their hinges, so as to double back into the shells or lobes. The arms may be further turned upon the pivot-pin $b$, so as to allow the appliance to be folded up compactly when not in use and to be placed in a case.

In the alternative form shown in Fig. 7 the basin-like shell is recessed out somewhat as before, but has at the base of the cut-away portion $e$ a part $n$ corresponding more or less with the part $f$, and these parts $f$ and $n$ are connected together by a light spiral spring $o$, which is adapted to better hold the appliance is position. This figure shows also a rod $p$, terminating in hooked end $q$, which is designed to form a hold on ladies' hair.

I do not confine myself to the exact form of shell or lobe illustrated. It is necessary, however, that it be designed to fit upon the ear and that it be flared outwardly to collect the sounds.

Having now particularly described and ascertained the nature of my said invention and in what manner the same is to be performed, I declare that what I claim is—

1. An appliance comprising handle, arms pivoted thereto, enlarged shells or lobes at the extremities of the arms formed to fit upon the ears of wearer and means for doubling back the arms near the shells substantially as and for the purposes described.

2. An appliance comprising handle $c$, arms $a$ pivoted thereto and formed in two portions hinged together and having grooves $m$ and sleeve $k$ with screw-pin $l$ for making the rods rigid or releasing same to double back, enlarged shells or lobes, at the extremities of the arms, of basin form with recessed-out portion to fit the ears of wearer and with turned-over edge at the recessed portion substantially as and for the purposes described.

3. An appliance comprising arms $a$ pivoted together at the center and carrying at the extremities enlarged shells or lobes formed with recessed-out portion $f$ to fit upon the ears of wearer and having light spring connection at either side of the recess and means comprising hooked bar $p$, $q$ for additionally holding the appliance in position substantially as and for the purposes described.

In testimony whereof I have signed my name to this specification in the presence of two subscribing witnesses.

PAULINE ANTONIE KLAWS.

Witnesses:
  A. O. SACHSE,
  A. HARKER.